United States Patent
Kalopissis et al.

[11] 3,758,573
[45] Sept. 11, 1973

[54] N-(HALOALKYL)-BENZENE AND PARA-TOLUENE SULFORAMIDES

[75] Inventors: Gregoire Kalopissis, Paris; Andree Bugaut, Boulogne-sur-Seine, both of France

[73] Assignee: L'Oreal, S.A., Paris, France

[22] Filed: June 20, 1972

[21] Appl. No.: 264,457

Related U.S. Application Data

[63] Continuation-in-part of Ser. Nos. 568,148, July 27, 1966, abandoned, and Ser. No. 568,118, July 27, 1966, abandoned, and Ser. No. 607,898, Jan. 9, 1967, Pat. No. 3,617,163, and Ser. No. 798,192, Feb. 10, 1969, abandoned, and Ser. No. 862,614, Sept. 8, 1969, abandoned.

[30] Foreign Application Priority Data

| July 30, 1965 | Luxembourg | 49,213 |
| Jan. 10, 1966 | Luxembourg | 50,233 |
| June 24, 1966 | Luxembourg | 51,408 |
| July 30, 1965 | Luxembourg | 49,214 |
| Jan. 27, 1966 | Luxembourg | 50,348 |
| Dec. 9, 1966 | Luxembourg | 52,555 |
| July 4, 1966 | Luxembourg | 51,474 |

[52] U.S. Cl. ...... 260/556 AR, 260/562 R, 260/517, 260/578, 260/326 S, 260/465 E, 260/293.79, 8/10, 8/10.1, 8/39

[51] Int. Cl. ......................................... C07c 143/78

[58] Field of Search ............................ 260/556 AR

[56] References Cited
OTHER PUBLICATIONS
J. Chem. Soc. 1957 Part 4: Pages 4174–4175 Braunholtz et al.

*Primary Examiner*—Henry R. Jiles
*Assistant Examiner*—S. D. Winters
*Attorney*—John W. Malley, Donald B. Deaver et al.

[57] ABSTRACT

Disubstituted N-halo-alkyl sulfonamide compounds suitable for use as intermediates for making hair dyes having the formula

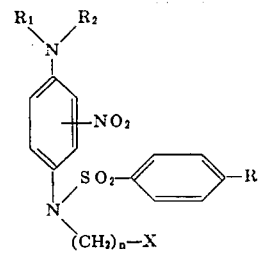

wherein R is hydrogen or methyl, $n$ is an integer from 2–6 inclusive, X is chlorine or bromine, $R_1$ is hydrogen or lower alkyl of 1–4 carbon atoms, $R_2$ is hydrogen, lower alkyl of 1–4 carbon atoms or acetyl, provided that $R_2$ is hydrogen and $R_1$ is lower alkyl when the $NO_2$ group is ortho to the $NR_1R_2$ group, and that $R_2$ is acetyl when the $NO_2$ group is meta of the $NR_1R_2$ group, are disclosed.

9 Claims, No Drawings

N-(HALOALKYL)-BENZENE AND PARA-TOLUENE SULFORAMIDES

SUMMARY OF THE INVENTION

This application is a continuation-in-part of applications Ser. No. 568,148, filed July 27, 1966, now abandoned; Ser. No. 568,118, filed July 27, 1966, now abandoned; Ser. No. 607,898, filed Jan. 9, 1967; now U.S. Pat. No. 3,617,163 dated Nov. 2, 1971; Ser. No. 798,192, filed Feb. 10, 1969, and now abandoned; and Ser. No. 862,614, filed Sept. 8, 1969, and now abandoned. The disclosures of these applications are incorporated by reference in the present application to further show methods of making and using the compounds of this application and methods and making and using compounds that are made using the compounds of this application.

The object of the present invention is to provide intermediate compounds to use in a process for preparing secondary amine hair dyes having an alkyl-ω-halogen chain, by using as intermediates their corresponding sulfonamide derivatives. The reactivity of the halogen atom makes these compounds very valuable as intermediates in synthesizing processes, as intermediates for forming nitrodiaminobenzene and ω-aminoalkylaminoanthraquinone hair dyes.

The compounds according to the present invention have the formula:

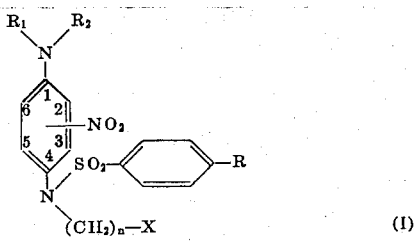

wherein R is selected from the group consisting of hydrogen and methyl, $n$ is an integer of 2–6 inclusive, X is selected from the group consisting of chlorine and bromine, $R_1$ is selected from the group consisting of hydrogen and lower alkyl having 1–4 carbon atoms, $R_2$ is a member selected from the group consisting of hydrogen, lower alkyl having 1–4 carbon atoms and acetyl, provided that when the —NO$_2$ group is ortho of

and $R_1$ is lower alkyl having 1–4 carbon atoms then $R_2$ is hydrogen, and provided further that $R_2$ is acetyl when the —NO$_2$ group is meta of

The compounds of the present invention are prepared according to the process wherein benzene sulfochloride or paratoluene sulfochloride is reacted with a primary amine having the formula

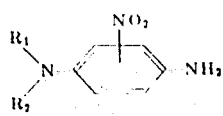

wherein $R_1$ and $R_2$ have the above significance; that the resulting monosubstituted sulfonamide is reacted with an alkaline hydroxide, an alkaline earth hydroxide, a sodium alcoholate, or sodium amide to obtain the corresponding alkaline or alkaline earth derivative, which is then isolated. This derivative is then reacted with an α,ω-dihaloalkane having the formula:

$$X - (CH_2)_n - X$$

in which X and $n$ have the above significance. The resulting N-ω-haloalkyl sulfonamide is then subjected to acid hydrolysis to yield as the end product a secondary N-ω-haloalkyl amine responding to the above Formula I.

As has been hereinbefore mentioned, these ω-haloalkyl secondary amines are valuable intermediates for use in the synthesis of other compounds, especially compounds in which the halogen is replaced by an amino group such compounds are excellent dyes. Also, for example, by condensing their halogen atoms with secondary amines, potassium phthalimide (Gabriel's reaction), potassium cyanide, and the like, it is possible to produce corresponding substitution derivatives, such as tertiary amines, primary amines, nitriles, etc. It should be emphasized that, instead of using the N-ω-haloalkyl secondary amine as an intermediate, it is also possible to use N-ω-halo-alkyl sulfonamide itself, and then proceed to hydrolysis. Of course, it is also possible to prepare the compounds of the present invention using other processes; the above process represents the preferred method of preparation.

It should also be noted that, even if the different steps of the process of making the novel compounds described herein are carried out in a conventional manner, the above process nevertheless offers the following advantages:

1. The isolation and utilization of the alkaline or alkaline earth derivatives of the intermediate sulfonamides in a pure state.

2. The condensation of these derivatives with α,ω-dihaloalkane in a solution in a polar aprotonic, nonionic solvent such, for example, as dimethylformamide which will not react with the halogen atom. This method of condensation is preferable to the one which consists in carrying out this condensation by heating the alkaline or alkaline earth derivative to reflux in an excess of α,ω-dihaloalkane, which method may also be resorted to in certain cases.

In order that the invention may be clearly understood, several embodiments thereof will now be further illustrated in the following examples. Unless otherwise indicated all parts and percentages are by weight and all temperatures as stated in degrees Centigrade.

EXAMPLE 1

PREPARATION OF THE DYE 1-N-METHYLAMINO-2-NITRO-4-[N'-β-BROMOETHYL]AMINO BENZENE

First step: Preparation of 1-N-methylamino-2-nitro-4-benezene-sulfonylamino benzene.

0.33 mole (58.2 g) of benzene sulfochloride is added little by little, at 45°C, while stirring, to a solution containing 0.3 mols (50.1 g) of 1-N-methylamino-2-nitro-4-amino benzene in 200 cm³ of pyridine. After this addition has been completed the reaction mixture is kept at room temperature for three hours and then poured over 1 kg of cracked ice to which 100 cm³ of concentrated hydrochloric acid has been added, and the crude product is dried. It is then redissolved in 300 cm³ of a 2 N solution of sodium hydroxide. The resulting solution is then filtered and 2 g of the starting product, which is insoluble in the sodium hydroxide solution is recovered. The solution is then neutralized with a 2 N solution of hydrochloric acid. Drying yields 87 g of 1-N-methyl-amino-2nitro-4-[benzene sulfonylamino] benzene, which, after recrystallization in alcohol, melts at 144°C.

| Analysis | Calculated for $C_{13}H_{13}N_3O_4S$ | Found | |
|---|---|---|---|
| C% | 50.81 | 51.11 | 50.98 |
| H% | 4.23 | 4.38 | 4.14 |
| N% | 13.68 | 13.90 | 13.70 |

Second step: Preparation of the potassium derivative of 1-N-methylamino-2-nitro-4-N'-benzenesulfonylamino benzene 1 mol (307 g) of 1-N-methylamino-2-nitro-4-N'-benzene-sulfonylamino benzene is dissolved in two liters of absolute ethanol. This solution is then poured into an alcoholic caustic potash solution obtained by dissolving 60 g of potash tablets in 180 cm³ of absolute alcohol, to which 30 cm³ of water has been added. After cooling and drying the yield is 320 g of the potassium derivative of the substituted benzenesulfonamide.

Third step: Preparation of 1-N-methylamino-2-nitro-4-(N'-benzene-sulfonyl-N'-β-bromoethyl)amino benzene.

Process A: Condensation by heating to reflux in an excess of 1,2-dibromo-ethane 0.1 mols (34.5 g) of the potassium salt of 1-N-methyl-amino-2-nitro-4-N'-benzenesulfonylamino benzene is heated for 9 hours, while being agitated, in 100 cm³ of 1,2-dibromo-ethane. This is filtered while boiling to eliminate the potassium bromide. After cooling the filtrate and adding a little hexane, drying yields 36 g of 1-N-methylamino-2-nitro-4-(N'-benzenesulfonyl-N'-β-bromo-ethyl) amino benzene. This product is treated with a cold ½ N sodium hydroxide solution to eliminate a little 1-N-methylamino-2-nitro-4-N'-benzenesulfonylamino benzene in the form of its sodium derivative. After washing with water and drying, the yield is 35 g of the desired product which, after recrystallization in benzene, melts at 172°C.

| Analysis | Calculated for $C_{15}H_{16}O_4N_3SBr$ | Found | |
|---|---|---|---|
| C% | 43.50 | 43.75 | 43.66 |
| H% | 3.86 | 4.05 | 4.08 |
| N% | 10.14 | 10.33 | 10.19 |

Process B: Condensation in solution in a polar aprotonic solvent 0.05 mols (17.25 g) of the potassium derivative of 1-methylamino-2-nitro-4-N'-benezenesulfonylamino benzene is dissolved in 40 cm³ of dimethylformamide. 0.1 mols (18.8 g) of 1,2-dibromo ethane is added and held in the reaction mixture for half an hour at 80°C. The solution is cooled and poured into 500 cm³ of water and drying yields 18.5 of the brominated derivative which, after treatment with a ½ N sodium hydroxide solution (to eliminate a little of the starting product) and washing with water, melts at 172°C. (No lowering of the melting point is noted when the product is mixed with that yielded by process A).

Fourth step: Preparation of 1-N-methylamino-2-nitro-4-N'-β-bromoethylamino benzene 0.376 mols (130 g) of 1-N-methylamino-2-nitro-4-(N', benzenesulfonyl-N'-β-bromo-ethyl)amino benzene is introduced little by little, while stirring, into 375 cm³ of concentrated sulfuric acid. After dissolution is complete, the reaction mixture is left for 24 hours at room temperature, and then poured over 6 kg of ice. After neutralization, drying yields 110 g of 1-N-methylamino-2-nitro-4-N'-β-bromoethylamino benzene. After recrystallization, in a benzenecyclohexane mixture the product melts at 86°C.

This compound can be used to dye live human hair and other keratinic fibers.

| Analysis | Calculated for $C_9H_{12}O_2N_3Br$ | Found | |
|---|---|---|---|
| C% | 39.45 | 39.55 | 39.62 |
| H% | 4.38 | 4.43 | 4.60 |
| N% | 15.33 | 15.32 | 15.45 |

EXAMPLE 2

USE OF THE BROMINATED PRODUCT OBTAINED IN THE FOURTH STEP OF EXAMPLE 1 TO PREPARE THE DYE 1-N-METHYLAMINO-2NITRO-4-{ β-[N''-β-(METHYL-(β-HYDROXYETHYL)-AMINO-ETHYL]}AMINO-BENZENE

A mixture of 0.15 mols (41 g) of 1N-methylamino-2-nitro-4-N'-β-bromoethylamino benzene, obtained as in Example 1, and 1.2 mols (90 g) of N,N-methyl-β-hydroxyethylamine are heated for 7 hours at 120°C. The eexcess of N,N-methyl-β-hydroxyethylamine is eliminated under vacuum. The oily residue is dissolved in benzene and this benzenic solution is washed in water, dried on sodium sulfate, and filtered. After having eliminated the benzene under vacuum, the yield is 38 g of 1-N-methylamino-2-nitro-4 { β-[N''-β-(methyl(β-hydroxyethyl)amino-ethyl]} amino benzene, which is practically pure. The oily product is dissolved in normal propyl alcohol, cooled in ice and saturated with dry gaseous hydrochloric acid. 46 g of the desired product is obtained in the form of the dihydrochloride, which melts and decomposes at between 135°C and 145°C.

When the oily base is regenerated in the conventional manner from this dihydrochloride and analyzed, the results are as follows:

| Analysis | Calculated for $C_{13}H_{20}N_4O_3$ | Found | |
|---|---|---|---|
| C% | 53.73 | 53.80 | 53.75 |
| H% | 7.46 | 7.55 | 7.49 |
| N% | 20.89 | 20.92 | 20.87 |

This compound is a dye particularly suitable for use in dyeing human hair.

EXAMPLE 3

USE OF THE BENZENESULFONAMIDE OBTAINED IN THE THIRD STEP OF EXAMPLE 1 TO PREPARE THE DYE 1-METHYLAMINO-2-NITRO-4-N'-β-PIPERIDINO-ETHYLAMINO BENZENE

First step: Preparation of 1-N-methylamino-2-nitro-4-(N'-benzene-sulfonyl-N'-β-piperidinoethyl) amino benzene 0.05 mols of the 1-N-methylamino-2-nitro-4(N'-benzene-sulfonyl-N'-β-bromoethyl)amino benzene obtained at the end of the third step of Example 1 is dissolved in 34 g of piperidine. This solution is heated to reflux for 8 hours, and the excess piperidine eliminated under vacuum. The residue is dissolved in 3 N hydrochloric acid and drying yields the desired product in the form of the hydrochloride.

The hydrochloride is redissolved in hot water, filtered while hot, cooled, and alkalized by a 2 N solution of sodium hydroxide. Drying yields 16 g of 1-N-methylamino-2-nitro-4-(N'-benzenesulfonyl-N'-β-piperidinoethyl)-amino benzene, which, after recrystallization in 50 percent alcohol melts at 110°C.

Second step: Preparation of 1-N-methylamino-2-nitro-4-N'-β-piperidinomethylamino benzene 0.024 mols (10 g) of the 1-N-methylamino-2-nitro-4-(N'-benzenesulfonyl-N'-β-piperidinoethyl)amino benzene is dissolved in 50 cm³ of concentrated sulfuric acid. The reaction mixture is left for 3 hours at room temperature, poured over cracked ice, and alkalized with a 5 N sodium hydroxide solution at five time normal strength. Drying yields 6 g of 1-N-methylamino-2-nitro-4-N'-β-piperidinoethylamino benzene which, after recrystallization in a benzenehexane mixture, melts at 68°C.

| Analysis | Calculated for $C_{14}H_{22}N_4O_2$ | Found | |
|---|---|---|---|
| C% | 60.43 | 60.38 | 60.25 |
| H% | 7.91 | 7.89 | 8.00 |
| N% | 20.14 | 20.02 | 20.16 |

The resulting composition is a dye particularly useful as a hair dye.

EXAMPLE 4

USE OF THE BENZENESULFONAMIDE OBTAINED IN THE THIRD STEP OF EXAMPLE 1 TO PREPARE THE DYE 1-METHALAMINO-2-NITRO-4-N'-β-AMINOETHYLAMINO BENZENE

First step: Preparation of 1-N-methylamino-2-nitro-4-(N'-benzenesulfonyl N'-β-phthalimidoethyl)-amino benzene 0.122 mols (50.5 g) of 1-N-methylamino-2-nitro-4-(N'-benzenesulfonyl N'-β-bromoethyl)amino benzene are dissolved in 150 cm³ of dimethylformamide. 0.162 mols (30 g) of potassium phthalimide are added and the reaction mixture heated for an hour in a boiling water-bath. It is filtered while hot, poured into two liters of water, and drying yields 57.5 g of the crude product which, after recrystallization in toluene, melts at 218°C.

| Analysis | Calculated for $C_{23}H_{20}O_6N_4S$ | Found | |
|---|---|---|---|
| C% | 57.53 | 57.28 | 57.10 |
| H% | 4.17 | 3.98 | 4.20 |
| N% | 11.66 | 11.67 | 11.66 |

Second step: Preparation of 1N-methylamino-2-nitro-4-(N'-benzenesulfonyl-N'-β-aminoethyl)amino benzene 0.0162 mols (7.8 g) of the substituted phthalimide obtained in the first step, in solution in propanol with 0.032 mols (1.6 g) of hydrazine hydrate, are heated to reflux for 2 hours. After cooling, drying yields a phthalhydrazide and the propanol is driven off under vacuum. The residue is then dissolved in normal hydrochloric acid, filtered, and the filtrate alkalized with sodium hydroxide. Drying yields 4 g of a crude product which, after recrystallization in alcohol, melts at 110°C.

Third step: Preparation of 1-methylamino-2-nitro-4-N'-β-aminoethylamino benzene 0.0074 mols (2.6 g) of 1-N-methylamino-2-nitro-4-(N'-benzenesulfonyl-N'-β-aminoethyl)amino benzene is dissolved in 15 cm³ of sulfuric acid. The reaction mixture is left for four hours at room temperature and then poured over cracked ice, and alkalized with sodium hydroxide. After drying, the yield is 1.1 g of a crude product which, after recrystallization in a mixture of benzene and hexane, melts at 120°.

| Analysis | Calculated for $C_9H_{14}O_2N_4$ | Found | |
|---|---|---|---|
| C% | 51.42 | 51.13 | 51.22 |
| H% | 6.66 | 6.51 | 6.51 |
| N% | 26.66 | 26.81 | 26.59 |

This compound is a dye particularly useful as a hair dye.

EXAMPLE 5

PREPARATION OF THE DYE 1-N-METHYLAMINO-2-NITRO-4-N'-γ-BROMOPROPYL-AMINO BENZENE

The first and second steps of the process are the same as those described in Example 1.

Third step: Preparation of 1-N-methylamino-2-nitro-4-(N'-benzenesulfonyl-N'-γ-bromopropyl)-amino benzene 0.1 mols (34.5 g) of the potassium derivative of 1-N-methylamino-2-nitro-4-N'-benzenesulfonylamino benzene is dissolved in 100 cm³ of dimethylformamide. 0.2 mols (40.4 g) of 1,3-dibromo propane is added, and after holding the reaction mixture for half an hour at 80°C, it is poured into a liter of water and drying yields 46 g of the crude product. This product is treated with a cold ½ N sodium hydroxide solution to eliminate a little sodium derivative of 1-N-methylamino-2-nitro-4-N'-benzene-sulfonylamino benzene, and then washed with water. By fractional crystallization in alcohol, 30 g of 1-N-methyl-amino-2-nitro-4-(N'-benzylsulfonyl-N'-γ-bromopropyl)amino benzene and 8 g of bis-[N'-([4-N-methyl-amino-3-nitro]phenyl)]-benzenesulfamidopropane are separated out. The former melts at 134°C and the latter at 190°C.

| Analysis of Product which melts at 134°C | Calculated for $C_{16}H_{18}N_3O_4Br$ | Found | |
|---|---|---|---|
| C% | 44.85 | 44.96 | 45.03 |
| H% | 4.20 | 4.01 | 4.17 |
| N% | 9.81 | 9.99 | 9.98 |

Fourth step: Preparation of 1-N-methylamino-2-nitro-4-N'-γ-bromopropylamino benzene 0.021 mols (9 g) of 1-N-methylamino-2-nitro-4-(N'-benzenesulfonyl-N'-γ-bromopropyl)amino benzene is dissolved at room temperature in 27 cm³ of concentrated sulfuric acid. After having left the reaction mixture for 24 hours at room temperature, it is poured over 350 g of crushed ice, and alkalized with sodium hydroxide. On drying, the yield is 5.5 g of 1-N-methylamino-2-nitro-4-N'-γ-bromopropylamino benzene which, after recrystallization in alcohol, melts at 62°C.

| Analysis | Calculated for $C_{10}H_{14}N_3O_2Br$ | Found |
|---|---|---|

|     |       |       |       |
|-----|-------|-------|-------|
| C%  | 41.66 | 41.79 | 41.67 |
| H%  | 4.86  | 4.76  | 4.66  |
| N%  | 14.58 | 14.80 | 14.69 |

EXAMPLE 6

FIRST METHOD OF PREPARING THE DYE 1-N-β-BROMOETHYLAMINO-2-NITRO-4-ACETYLAMINO BENZENE

First step: Preparation of 1-N-p-toluenesulfonylamino-2-nitro-4-acetylamino benzene 1.5 mols (286 g) of p-toluenesulfochloride is added little by little, while stirring, at between 30° and 35°C, to a solution of 1.3 mols (235.5 g) of 1-amino-2-nitro-4-acetylamino benzene in 900 cm³ of pyridine. After this has been done, the reaction mixture is kept for 2 hours at 35°C and poured over 4 kg of cracked ice, and treated with 450 cm³ of concentrated hydrochloric acid. Drying yields the desired crude product. This is dissolved in a 2 N solution of sodium hydroxide. The resulting solution is filtered, (thereby eliminating a little of the starting product as well as 1-N-bis-p-toluenesulfonylamino-2-nitro-4-acetylamino benzene) and then neutralized with hydrochloric acid. Drying yields 390 g of 1-N-p-toluene-sulfonylamino-2-nitro-4-acetylamino benzene which, after recrystallization in alcohol, melts at 162°C.

| Analysis | Calculated for $C_{15}H_{15}N_3O_5S$ | Found |       |
|----------|--------------------------------------|-------|-------|
| C%       | 41.57                                | 51.51 | 51.77 |
| H%       | 4.29                                 | 4.42  | 4.12  |
| N%       | 12.03                                | 12.11 | 12.12 |

Second step: Preparation of the calcium derivative of 1N-p-toluenesulfonylamino-2-nitro-4-acetylamino benzene 0.287 mols (100 g) of 1-N-p-toluenesulfonylamino-2-nitro-4-acetylamino benzene is added while stirring to a liter of water to which 0.287 mols (16 g) of quick lime has first been added. Agitation is continued for 3 hours and drying yields the calcium derivative. In order to eliminate the excess lime, this derivative is agitated for an hour in 300 cm³ of a saturated ammonium chloride solution, dried, and washed first with a little water, and then with alcohol and acetone. 94 g of the calcium derivative is obtained.

Third step: Preparation of 1(N-p-toluenesulfonyl-N-β-bromoethyl)amino- 2-nitro- 4-acetylamino benzene 0.01 mols (7.36 g) of the calcium derivative of 1-N-p-toluenesulfonylamino- 2-nitro-4-acetylamino benzene is dissolved in 36 cm³ of dimethylformamide. 0.02 mols (3.76 g) of 1,2-dibromoethane is added. The mixture is heated for an hour and a half in a boiling water-bath, and poured into 400 cm³ of water. Drying yields 7.9 g of the crude product which, after treatment with a normal sodium hydroxide solution to eliminate a little 1-N-p-toluenesulfonylamino-2-nitro-4-acetylamino benzene used to start the reaction, is washed with water and then recrystallized in an acetone-water mixture. The resulting product melts at 215°C and analyzes as follows:

| Analysis | Calculated for $C_{17}H_{18}N_3O_5SBr$ | Found |       |
|----------|----------------------------------------|-------|-------|
| C%       | 44.73                                  | 44.63 | 44.62 |
| H%       | 3.94                                   | 4.14  | 4.04  |
| N%       | 9.21                                   | 9.12  | 9.17  |

Fourth step: Preparation of 1-N-β-bromoethylamino-2-nitro-4-acetylamino benzene 0.088 mols (4.015 g) of 1(N-p-toluenesulfonyl-N-β-bromoethyl)-amino-2-nitro-4-acetylamino benzene is dissolved in 16 cm³ of concentrated sulfuric acid at between 0° and 5°C. The reaction mixture is left to stand for 3 hours and then poured over 150 g of crushed ice. Drying yields 2.4 g of 1-N-β-bromoethylamino-2-nitro-4-acetylamino benzene which, after recrystallization in ethyl acetate, melts at 156°C.

| Analysis | Calculated for $C_{10}H_{12}N_3O_3Br$ | Found |       |
|----------|---------------------------------------|-------|-------|
| C%       | 39.73                                 | 40.15 | 40.42 |
| H%       | 3.97                                  | 4.06  | 4.15  |
| N%       | 13.90                                 | 14.08 | 13.95 |

EXAMPLE 7

SECOND METHOD OF PREPARING THE DYE 1-N-β-BROMO-ETHYLAMINO-2-NITRO-4-ACETYLAMINO BENZENE

First step: Preparation of 1-N-p-toluenesulfonylamino-2-nitro-4-acetylamino benzene The procedure is the same as in the first step of Example 6.

Second step: Preparation of sodium derivative of 1-N-p-toluenesulfonylamino-2-nitro-4-acetylamino benzene A slight excess of sodium ethylate is added to a toluene solution of 1-N-p-toluenesulfonylamino-2-nitro-4-acetylamino benzene. Drying yields the sodium derivative, which precipitates instantaneously.

Third step: Preparation of 1-(N-p-toluenesulfonyl-N-β-bromoethyl)-amino-2-nitro-4-acetylamino benzene The procedure is the same as in Example 6, except that the reaction mixture need be heated in the boiling water-bath for only half an hour instead of an hour and a half.

Fourth step: Preparation of 1-N-β-bromoethylamino-2-nitro-4-acetylamino benzene

The procedure is the same as in Example 6.

EXAMPLE 8

PREPARATION OF THE DYE 1-N-β-CHLOROETHYLAMINO-2-NITRO-4-AMINO BENEZENE

First and second steps:

The procedure is the same as that used in the first and second steps of Example 7 to prepare the sodium derivative of 1-N-p-toluenesulfonylamino-2-nitro-4-acetylamino benzene.

Third step: Preparation of 1-(N-p-toluenesulfonyl-N--chloroethyl)-amino-2-nitro-4-acetylamino benzene 0.122 mols (45 g) of the sodium derivative is dissolved in 250 cm³ of dimethylformamide. 0.49 mols of 1,2-dichloro-ethane are added and the mixture heated for four hours in a boiling water bath. The reaction mixture is then poured over two kilograms of cracked ice and drying yields the crude product, which is then treated with a normal sodium hydroxide solution to eliminate the monosubstituted p-toluene-sulfonamide used as a starting substance. The insoluble fraction (15 g) of the resulting solution is 1-(N-p-toluene sulfonyl-N--chloroethylamino-2-nitro-4-acetylamino benzene which, after washing with water and recrystallization in ethyl acetate, melts at 196°C.

Fourth step: Preparation of 1-N--chloroethylamino-2-nitro-4-amino benzene 0.01 mols (4.1 g) of 1-(N-p-toluenesulfonyl-N-β-chloroethyl) amino-2-nitro-4-acetylamino benzene is introduced into a mixture consisting of 10 cm³ of concentrated hydrochloric acid and 10 cm³ of acetic acid. This is heated for two hours in a boiling water bath, cooled, and on drying yields the desired product in the form of the hydrochloride. After dissolving the hydrochloride in cold water, its pH is brought to 4 by adding ammonia and drying yields 1.9 g of 1-N--chloroethylamino-2-nitro-4-amino benezene which, after recrystallization in benzene, melts at 115°C.

| Analysis | Calculated for $C_8H_{10}O_2N_3Cl$ | Found | |
|---|---|---|---|
| C% | 44.54 | 44.56 | 44.58 |
| H% | 4.64 | 4.51 | 4.58 |
| N% | 19.48 | 19.54 | 19.50 |

EXAMPLE 9

USE OF THE PRODUCT PREPARED IN THE THIRD STEP OF EXAMPLE 6 TO PREPARE THE DYE 1-N-β-PIPERIDINOETHYLAMINO-2-NITRO-4-AMINO BENZENE

First step: Preparation of 1-(N-p-toluenesulfonyl-N-ββ-piperidinoethyl)amino-2-nitro-4-acetylamino benzene.

0.0132 mols (6 g) of 1-(N-p-toluenesulfonyl-N-β-bromoethyl)-amino-2-nitro-4-acetylamino) benzene is dissolved in 10 cm³ of piperidine and heated to reflux for 8 hours. It is then filtered while hot, the piperidine is eliminated under vacuum, and the residual product is dissolved in a 1/2 N hydrochloric solution. This is filtered and alkalized, suing a normal sodium hydroxide solution. Drying yields 5.6 g of 1-N-p-toluenesulfonyl-N-β-piperidinoethyl)amino-2-nitro-4-acetylamino)benzene which, after recrystallization in alcohol, melts at 130°C.

Second step: De-tosylation and de-acetylation 0.0055 mols of 1-(N-p-toluenesulfonyl-N-β-piperidino-ethyl)amino-2-nitro-4-acetylamino)benzene is dissolved in 10 cm³ of concentrated hydrochloric acid and heated for 4 hours in a boiling water bath. It is then diluted with 50 cm³ of water, and alkalized with a 2N sodium hydroxide solution. Drying yields 1.3 g of 1-N-β-piperidinoethylamino-2-nitro-4-amino benzene which after recrystallization in a benzene-hexane mixture, melts at 95°C.

| Analysis | Calculated for $C_{13}H_{24}N_4O_2$ | Found | |
|---|---|---|---|
| C% | 59.09 | 59.10 | 59.03 |
| H% | 7.57 | 7.56 | 7.62 |
| N% | 21.21 | 21.25 | 21.31 |

The resulting compound is a dye particularly useful for dyeing the hair.

EXAMPLE 10

PREPARATION OF THE DYE 1-N-β-BROMOETHYLAMINO-2-NITRO-4-(N'-METHYL-N'-ACETYL)AMINO BENZENE

First step: Preparation of 1-p-toluenesulfonylamino-2-nitro-4-(N'-methyl-N'-acetyl)amino benzene 1.08 mols (206 g) of p-toluenesulfochloride is added little by little, while stirring, at between 40° and 45°C, to a solution of 0.94 mols (197 g) of 1-amino-2-nitro-4-(N'-methyl-N'-acetyl)amino benzene in 210 cm³ of pyridine. After this addition has been completed, the reaction mixture is kept for 24 hours at room temperature, and then poured over 3 kg of cracked ice, to which 450 cm³ of concentrated hydrochloric acid has been added. A crude product is isolated which is then dissolved in methylisobutylcetone. The methylisobutylcetone solution is extracted with a 2N solution of sodium hydroxide. The sodium phase is acidified to pH 5 and drying yields 136 g of 1-p-toluenesulfonyl-amino-2-nitro-4-(N'-methyl-N'-acetyl)amino benzene which, after recrystallization in alcohol, melts at 120°C.

| Analysis | Calculated for $C_{16}H_{17}N_3O_5S$ | Found | |
|---|---|---|---|
| C% | 52.89 | 53.03 | 52.82 |
| H% | 4.68 | 4.55 | 5.59 |
| N% | 11.57 | 11.53 | 11.70 |

Second step: Preparation of the potassium derivative of 1-N-p-toluenesulfonylamino-2-nitro-4-(N'-methyl-N'-acetyl)amino benzene 0.293 mols (77 g) of 1-N-p-toluenesulfonylamino-1-nitro-4(N'-methyl-N'-acetyl)amino benzene is dissolved at reflux in 311 cm³ of 95° alcohol and poured little by little, while still boiling and being agitated, into 165 cm³ of a cold solution of potash in alcohol (25 g of potash per 100 cm³ of alcohol). This is cooled, and on drying yields 86 g of the potassium derivative.

Third step: Preparation of 1-(N-p-toluenesulfonyl-N-β-bromoethyl)amino-2-nitro-4-(N'-methyl-N'-acetyl)amino benzene 0.125 mols (50 g) of the above potassium derivative is dissolved in 145 cm³ of dimethylformamide. 0.37 mols (32cm³) of 1,2-dibromo ethane is added. This reaction mixture is heated for an hour in a boiling water bath. After cooling, it is poured into 1.5 liters of water and the ethyl acetate is extracted. The ethyl acetate solution is extracted by using a normal iced sodium hydroxide solution to eliminate a little 1-N-p-toluenesulfonylamino-2-nitro-4-(N'-methyl-N'-acetyl)amino benzene in the form of its sodium derivative, and is then washed with water. After concentrating the ethyl acetate solution and adding hexane, drying yields 43 g of 1-(N-p-toluenesulfonyl-N-β-bromoethyl)amino-2-nitro-4-(N'-methyl-N'-acetyl)amino benzene which, after recrystallization in alcohol, melts at 137°C.

| Analysis | Calculated for $C_{18}H_{20}N_3O_5S\,Br$ | Found | |
|---|---|---|---|
| C% | 45.95 | 45.94 | 45.91 |
| H% | 4.25 | 4.35 | 4.16 |
| N% | 8.93 | 9.15 | 9.09 |

Fourth step: Preparation of the dye 1-N-β-bromoethylamino-2-nitro-4-(N'-methyl-N'-acetyl)amino benzene by detosylation.

0.0213 mols (10 g) of 1-(N-p-toluenesulfonyl-N-β-bromo-ethyl)amino-2-nitro-4-(N'-methyl-N'-acetyl)amino benzene is dissolved, while stirring in 20 cm³ of concentrated sulfuric acid, while maintaining its temperature between 0° and 5°C. The reaction mixture is left for 5 hours at 0°c, and then poured over 150 g of ice. Drying yields 6 g of 1N-β-bromoethyl-2-nitro-4-(N'-methyl-N'-acetyl)amino benzene which, after recrystallization in ethyl acetate, melts at 131°C.

| Analysis | Calculated for $C_{11}H_{14}N_3O_3Br$ | Found |
|---|---|---|

| C% | 41.77 | 41.78 | 41.88 |
| H% | 4.43 | 4.54 | 4.60 |
| N% | 13.29 | 13.23 | 13.25 |

EXAMPLE 11

USE OF THE PRODUCT PREPARED IN THE THIRD STEP OF EXAMPLE 10 TO PREPARE THE DIHYDROCHLORIDE DYE OF 1-N-β-AMINOETHYLAMINO-2-NITRO-4-N'-METHYLAMINO BENZENE

First step: Preparation of 1-(N-p-toluenesulfonyl-N-β-phthalimidoethyl)amino-2-nitro-4-(N'-methyl-N'-acetyl)amino benzene.

0.0266 mols (12.44 g) of 1-(N-p-toluenesulfonyl-N-β-bromoethyl)amino-2-nitro-4-(N'-acetyl)amino benzene is dissolved in 40 cm³ of dimethylformamide, and 0.03 mols (5.6 g) of potassium phthalimide is then added thereto. The reaction mixture is heated for three quarters of an hour in a boiling water-bath, filtered while hot, and poured into 300 cm³ of water. Drying yields 12.5 g of 1-(N-p-toluene-sulfonyl-N-β-phthalimidoethyl)amino-2-nitro-4-(N'-methyl-N'-acetyl)amino benzene which, after recrystallization in dioxane, melts at 188°C.

| Analysis | Calculated for $C_{25}H_{24}O_7N_4S$ | Found | |
|---|---|---|---|
| C% | 58.20 | 58.40 | 58.29 |
| H% | 4.47 | 4.54 | 4.54 |
| N% | 10.44 | 10.21 | 10.37 |

Second step: Preparation of 1-N-β-phthalimidoethylamino-2-nitro-4-(N'-methyl-N'-acetyl)amino benzene 0.0112 mols (6 g) of 1-(N-p-toluenesulfonyl-N-β-phthalimidoethyl)amino-2-nitro-4-(N'-methyl-N'-acetyl)amino benzene is dissolved at between 0°C and 5°C in 15 cm³ of concentrated sulfuric acid and the reaction mixture is left for four hours at this temperature. It is then poured over cracked ice and on drying, yields 4 g of 1-N-β-phthalimidoethyl-amino-2-nitro-4-(N'-methyl-N-'-acetyl)amino benzene which, after recrystallization in dimethylformamide, has two melting points, at 172°C and 205°C respectively.

| Analysis | Calculated for $C_{19}H_{18}N_4O_6$ | Found | |
|---|---|---|---|
| C% | 59.68 | 59.78 | 59.76 |
| H% | 4.71 | 4.93 | 4.92 |
| N% | 14.65 | 14.76 | 14.83 |

Third step: Preparation of 1-N-β-aminoethylamino-2-nitro-4-(N'-methyl-N'-acetyl)amino benzene.

0.0192 mols (7.3 g) of the substituted phthalimide obtained in second step, in solution in 50 cm³ of propanol with 0.039 mols (1.96 g) of hydrazine hydrate is heated to reflux for an hour and a half. After cooling, the phthalhydrazide formed is eliminated by drying and half of the propanol is eliminated under vacuum. Drying yields 4.1 g of 1-N-β-aminoethylamino-2-nitro-4-(N'-methyl-N'-acetyl) amino benzene which, after recrystallization in alcohol, melts at 137°C.

Fourth step: Preparation of the dihydrochloride of 1-N-β-aminoethylamino-2-nitro-4-N'-methylamino benzene 0.016 mols (4.04 g) of 1-N-β-aminoethylamino-2-nitro-4-(N'-methyl-N'-acetyl)amino benzene is heated in a mixture of 6 cm³ of concentrated hydrochloric acid and 1 cm³ of acetic acid, in a boiling water bath, for three hours. After cooling and drying the yield is 3.25 g of the dihydrochloride of 1-N-β-aminoethylamino-2-nitro-4-N'-methylamino benzene which, after recrystallization in concentrated hydrochloric acid, melts while decomposing at about 190°C.

This composition is a dye which is particularly useful for dyeing hair.

EXAMPLE 12

The following solution is prepared:

| | |
|---|---|
| Iodide of β-[N-methyl-N(3-nitro-4-N'-methyl-amino)-phenyl]aminoethyl methyl-piperidinium | 0.4 g |
| Lauric alcohol oxyethylenated with 10.5 molecules of ethylene oxide | 5 g |
| Sodium carbonate, q.s.p. | pH 9 |
| Water, q.s.p. | 100 cm³ |

This solution, applied to deep blond hair and left for 15 minutes, yields, after rinsing and shampooing, a strong auburn.

EXAMPLE 13

The following solution is prepared:

| | |
|---|---|
| Dihydrochloride of 1-N-methylamino-2-nitro-4-N'-methyl-N'-β-(methyl-hydroxyethylamino)ethylamino benzene | 0.17 g |
| 1-N-γ-(diethylaminopropyl)amino-2-amino-4-nitro benzene | 0.5 g |
| Lauric alcohol oxyethylenated with 10.5 molecules of ethylene oxide | 5 g |
| Sodium carbonate, q.s.p. | pH 9 |
| Water, q.s.p. | 100 cm³ |

This solution, applied for 15 minutes to 100 percent white hair, yields, after rinsing and shampooing, a reddish-gold blond.

EXAMPLE 14

The following solution is prepared:

| | |
|---|---|
| Dihydrochloride of --N-methylamino-2-nitro-4-N'-methyl-N'-diethylamino-ethylaminobenzene | 0.03 g |
| 1-N-γ-(diethylaminopropyl)-amino-2-amino-4-nitro benzene | 0.01 g |
| Lauric alcohol oxyethylenated with 10.5 molecule of ethylene oxide | 5 g |
| Monoethanolamine, q.s.p. | pH 9 |
| Water, q.s.p. | 100 cm³ |

This solution, applied for 10 to 15 minutes to hair previously bleached platinum, yields, after rinsing and shampooing, a light copper mahogany tint.

EXAMPLE 15

The following solution is prepared:

| | |
|---|---|
| Dihydrochloride of 1-N-methylamino-2-nitro-4-[N'-β-hydroxyethyl-N'-β-diethylaminoethyl-]amino-benzene | 0.152 g |
| 4-nitro-1,3-phenylenediamine | 0.030 g |
| Lauric alcohol oxyethylenated with 10.5 molecules of ethylene oxide | 5 g |
| Sodium carbonate 2 N, q.s.p. | pH 9 |
| Water, q.s.p. | 100 cm³ |

This solution applied to 100 percent white hair for 15 minutes, yields, after rinsing and shampooing, a beige shade.

EXAMPLE 16

The following solution is prepared:

Dihydrochloride of
1-N-methylamino-2-nitro-4-(N'-methyl-N'- 0.03 g
β-aminoethyl)-amino benzene
4-nitro-1,3-phenylenediamine 0.05 g
Lauric alcohol oxyethylenated with 10.5
molecules of ethylene oxide 7 g
Sodium carbonate, q.s.p. pH 7
Water, q.s.p. 100 cm³

This solution, applied to 100 percent white hair for 15 minutes, yields, after rinsing and shampooing, a beige tint.

EXAMPLE 17

The following solution is prepared:

1-N-β-
(methyl-hydroxyethyl)-aminoethylamino2-
nitro-4-N'-methylamino benzene 0.14 g
N-γ-(diethylaminopropyl)-animo-2-amino 4
nitro benzene 0.05 g
Lauric alcohol oxyethylenated with 10
molecules of ethylene oxide 5 g
Sodium carbonate, q.s.p.; pH 9
Water, q.s.p. 100 cm³

This solution applied to 100 percent white hair for 15 minutes yields, after rinsing and shampooing, a reddish blond.

WHAT IS CLAIMED IS:
1. A compound having the formula

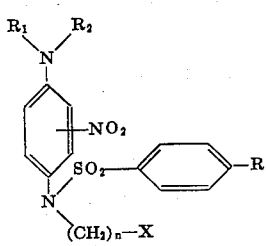

wherein R is selected from the group consisting of hydrogen and methyl, $n$ is an integer of 2-6 inclusive, X is selected from the group consisting of chlorine and bromine, $R_1$ is selected from the group consisting of hydrogen and lower alkyl having 1-4 carbon atoms, $R_2$ is a member selected from the group consisting of hydrogen, lower alkyl having 1-4 carbon atoms and acetyl, provided that when the $-NO_2$ group is ortho of

and $R_1$ is lower alkyl having 1-4 carbon atoms, then $R_2$ is hydrogen, and provided further that $R_2$ is acetyl when the $-NO_2$ group is meta of

2. The compound of claim 1 selected from the group consisting of
1-N-methylamino-2-nitro-4-(N'-benzene-sulfonyl-N'-β-bromoethyl)amino benzene;
1-N-methylamino-2-nitro-4-(N'-benzenesulfonyl-N'-γ-bromopropyl)-amino benzene;
1(N-p-toluenesulfonyl-N-β-bromoethyl)amino-2-nitro-4-acetylamino benzene; 1-(N-p-toluenesulfonyl-N-β-chloroethyl)-amino-2-nitro-4-acetylamino benzene; and
1-(N-p-toluenesulfonyl-N-β-bromoethyl)amino-2-nitro-4-(N'-methyl-N'-acetyl)amino benzene.
3. The compound of claim 1 wherein $R_2$ is acetyl.
4. The compound of claim 1 wherein $n$ is 2.
5. The compound of claim 1 wherein $n$ is 3.
6. The compound of claim 1 wherein R is methyl.
7. The compound of claim 1 wherein $R_2$ is methyl.
8. The compound of claim 1 wherein X is bromine.
9. The compound of claim 1 wherein X is chlorine.

* * * * *